(12) United States Patent
Devroy et al.

(10) Patent No.: US 12,056,021 B2
(45) Date of Patent: Aug. 6, 2024

(54) DATABASE ARCHIVING AND ACCESS ACROSS UPDATES TO DATABASE METADATA

(71) Applicant: BMC Software, Inc., Houston, TX (US)

(72) Inventors: Rupak Ranjan Devroy, Katy, TX (US); Carroll William Andrews, Jr., Houston, TX (US)

(73) Assignee: BMC Software, Inc., Houston, TX (US)

( * ) Notice: Subject to any disclaimer, the term of this patent is extended or adjusted under 35 U.S.C. 154(b) by 180 days.

(21) Appl. No.: 17/450,686

(22) Filed: Oct. 12, 2021

(65) Prior Publication Data
US 2023/0115489 A1    Apr. 13, 2023

(51) Int. Cl.
| | | |
|---|---|---|
| *G06F 16/00* | (2019.01) | |
| *G06F 11/14* | (2006.01) | |
| *G06F 16/11* | (2019.01) | |
| *G06F 16/23* | (2019.01) | |

(52) U.S. Cl.
CPC ...... *G06F 11/1469* (2013.01); *G06F 11/1451* (2013.01); *G06F 16/113* (2019.01); *G06F 16/2358* (2019.01)

(58) Field of Classification Search
None
See application file for complete search history.

(56) References Cited

U.S. PATENT DOCUMENTS

| | | | | |
|---|---|---|---|---|
| 11,199,994 | B1 * | 12/2021 | Animesh | G06F 3/0604 |
| 2004/0141661 | A1 * | 7/2004 | Hanna | G16H 80/00 |
| | | | | 707/999.107 |
| 2005/0044110 | A1 * | 2/2005 | Herzenberg | G16B 50/00 |
| 2006/0242205 | A1 * | 10/2006 | Schmidt | G06F 11/1451 |
| 2007/0283417 | A1 * | 12/2007 | Smolen | G06F 16/2308 |
| | | | | 726/2 |
| 2013/0117232 | A1 * | 5/2013 | Lee et al. | G06F 16/113 |
| 2016/0048522 | A1 * | 2/2016 | Wilcock | G06F 16/113 |
| | | | | 707/662 |
| 2016/0342661 | A1 * | 11/2016 | Wilcock | G06F 16/113 |
| | | | | 707/662 |
| 2019/0026044 | A1 * | 1/2019 | Grube | G06F 3/0619 |
| 2019/0034453 | A1 * | 1/2019 | Jarvis | G06F 16/113 |
| 2020/0142364 | A1 * | 5/2020 | Craig | G05B 13/04 |
| 2023/0115489 | A1 * | 4/2023 | Devroy | G06F 11/1469 |
| | | | | 711/162 |

* cited by examiner

*Primary Examiner* — Hasanul Mobin
(74) *Attorney, Agent, or Firm* — Brake Hughes Bellermann LLP (57) ABSTRACT

Described systems and techniques enable the capture of an archive image copy of at least one database at a first time, as well as the capture of database metadata that includes a runtime environment of the at least one database. The archive image copy and the database metadata may be stored. A request to restore the at least one database may be received at a second time. In response to the request, the archive image copy and the database metadata may be determined. The at least one database may be restored, including re-establishing the runtime environment using the database metadata.

20 Claims, 7 Drawing Sheets

DATABASE ARCHIVING AND ACCESS ACROSS UPDATES TO DATABASE METADATA

TECHNICAL FIELD

This description relates to database archiving.

BACKGROUND

Many businesses (and other entities) use large databases of operational data that support efforts and goals of the businesses. To name just a few examples, businesses may maintain databases of customer data, user data, inventory data, or financial transaction data.

Problems requiring technical solutions include database archiving and recovery of many databases after they have been updated, which sometimes occur over many years. Other problems include being able to retrieve archived databases easily, quickly, and reliably without interrupting ongoing database operations, which archived databases may be used, e.g., to maintain compliance with governmental or other retention mandates, perform debugging of error conditions caused by one or more of the updates, enable disaster recovery, and provision test data to test database operations.

Other problems requiring technical solutions are that over time, updates are made to the database, the data, or the actual structure of the data, which may change, e.g., due to changes in business or other external requirements.

Database archiving refers to the practice of capturing data of a database at a point in time. Resulting database archives may need to be kept for long periods of time, such as five or ten years, or more.

Unfortunately, in some cases, it may be difficult to access archived databases. For example, during intervening years between data capture and attempted data access, changes may be made to database metadata that governs structural elements and access requirements of a database.

Consequently, attempts to access an archived database may fail, or may result in retrieving poorly formatted data or undesired data. Additional efforts may be required to access the archived data in a desired manner. In some cases, an archived database may become inaccessible.

SUMMARY

According to one general aspect, a computer program product may be tangibly embodied on a non-transitory computer-readable storage medium and may include instructions that may be executed by at least one computing device. When executed, the instructions may be configured to cause the at least one computing device to capture an archive image copy of at least one database at a first time, and to capture database metadata that includes a runtime environment of the at least one database. When executed, the instructions may be configured to cause the at least one computing device to store the archive image copy and the database metadata. When executed, the instructions may be configured to cause the at least one computing device to receive a request to restore the at least one database at a second time, determine, in response to the request, the archive image copy and the database metadata, and restore the at least one database including re-establishing the runtime environment using the database metadata.

According to other general aspects, a computer-implemented method may perform the instructions of the computer program product, and a system, such as a mainframe, server, or distributed server system, may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations of the technical solutions described in this Specification are set forth in the accompanying drawings and the description below. Other features will be apparent from the description and drawings, and from the claims.

DETAILED DESCRIPTION

Described systems and techniques enable database archiving and recovery of many databases while the many databases undergo many different updates, even when the updates occur over many years. As a result, it is possible to retrieve an archived database easily, quickly, and reliably. As described in detail below, the archived database may be used, e.g., to maintain compliance with governmental or other retention mandates, perform debugging of error conditions caused by one or more of the updates, enable disaster recovery, and provision test data to test database operations without interrupting ongoing database operations.

For example, as referenced above, many businesses and other entities may have requirements to archive data. To provide some non-limiting examples, banks, insurance companies, schools, hospitals, governmental organizations, and other entities may be required by internal or external mandates to archive data to a required extent and for a required time period.

For example, hospitals may be required to comply with the Health Insurance Portability and Accountability Act (HIPAA). Companies in Europe may be required to comply with European General Data Protection Regulations (GDPR) requirements. Businesses may be required to archive data to comply with tax rules and regulations. In other examples, entities may self-impose archiving requirements, e.g., for analysis of historical operations or other internal reasons.

Time periods for archiving requirements may be defined at 5, 10, or more years. During such extended timeframes and considering the potentially large quantities of data and databases to be archived, it is likely that updates to structural and operational aspects of the database(s) being archived may occur.

That is, as also referenced above and described in detail, below, a database is used to store data within physical memories. Database metadata is used to define the manners in which the data is mapped, allocated, updated, deleted, and retrieved to and from the physical memory, as well as how the data is formatted and otherwise provided to applications (and users of those applications) from the database.

For example, in a simple example, a database that stores individuals' names may be defined with a maximum character limit of 80 spaces, or, put, another way, the database may have a field "name" that is allocated 80 bytes of physical memory. Therefore, a name retrieval operation may designate a first or beginning byte of 80 consecutive bytes to retrieve.

The allocation of 80 spaces or bytes to a username is arbitrary and subject to change. For example, it may occur that new users are stored having up to 100 characters in their names. A database definition, which may be an example of database metadata, mapping the field username to 80 bytes may be changed to map the field username to 100 bytes.

In conventional archiving techniques, archive images may be captured both before and after such an update. Then, an archived database from after the update may easily be retrieved and restored because such an archived database would comply with the current database definition. However, archived database from before the update would be difficult or impossible (at practical scales of millions of users) to retrieve. For example, an attempt to retrieve pre-update name data might result in retrieving a desired username, but with the first 20 characters of a subsequent name appended to the end of the desired username. This example illustrates that even small updates to database metadata may hinder or prevent successful and efficient archiving efforts.

Moreover, such updates may occur in many different contexts, at different times, and for different reasons. For example, a database may be updated to reflect underlying growth in the data being stored, such as when a database designed to use enough physical memory to store a million names is redesigned to store two million names. In other examples, a database may be redesigned to be more efficient, such as when a new database partitioning scheme is used. In still other examples, a security of a database may be enhanced, e.g., using encryption, so that some archived data is encrypted while earlier archived data is not encrypted.

In order to ensure that an archived database is retrievable and accessible in the above and many other cases, described techniques capture not just data of the database being archived, but also database metadata that includes a runtime environment that is sufficient to re-deploy the updated or re-designed archived database once the data of the archived database is retrieved from storage. Moreover, described techniques may include techniques for identifying and locating each archived database and corresponding metadata, so that subsequent data restoration may be executed. Consequently, it is possible to archive large numbers of databases, each potentially associated with different operational metadata, across many years and intervening updates and/or re-designs, while still ensuring easy, fast, accurate, timely, and reliable retrieval of the archived database.

Figure 1:
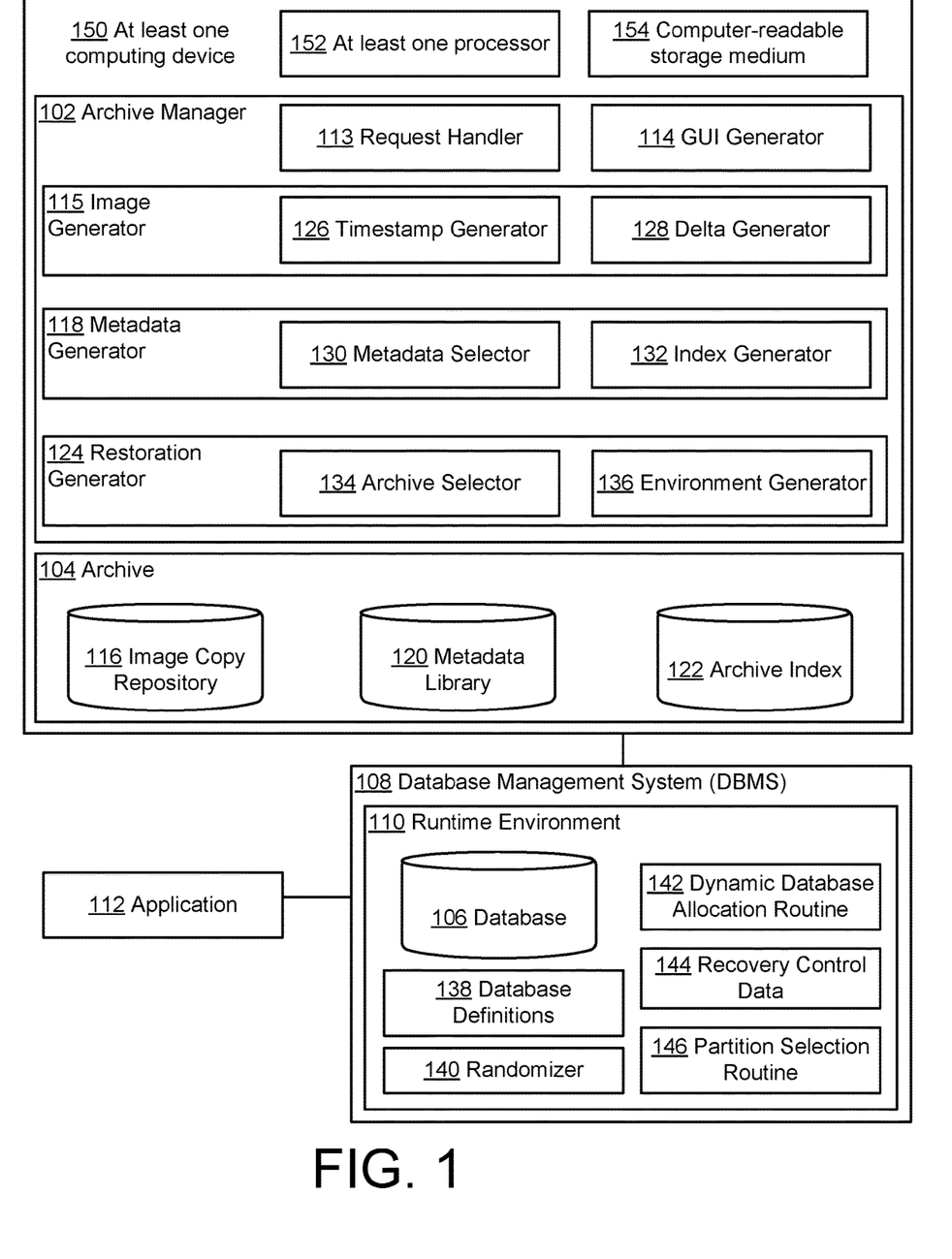
FIG. 1 is a block diagram of a system for database archiving and access across updates to database metadata.

FIG. 1 is a block diagram of a system for database archiving and access while undergoing updates to database metadata. In the example of FIG. 1, an archive manager 102 may be configured to populate and utilize an archive 104, to archive data from a database 106 during many years.

In FIG. 1, the database 106 may represent many different databases, each of which may be archived by the archive manager 102 at any desired or specified time. For example, multiple databases may be deployed across a technical, operational, and/or geographical landscape of a business.

Each database 106 may be executed in the context of a database management system (DBMS) 108. In general, the DBMS 108 enables definition of a structure and configuration of the database 106, while enabling access, use, updating, re-design, and operation of the database 106.

For example, the DBMS 108 may provide standardized structural aspects of the database 106, while also providing one or more interfaces for customizing a use and implementation of the database 106. For example, in the specific examples of FIGS. 3-6, an Information Management Systems (IMS) system is described as an example DBMS 108, which uses interface(s) referred to as a Data Language/Interface (DL/I) or a Data Language/1. The IMS system provides a core hierarchical structure for data records (with a root-parent-child-sibling hierarchy) along with various other core or universal aspects of database management across all implemented databases, but with many opportunities for users to utilize the DL/I to create updates and other customizations.

As a result, the database 106 may be configured to execute in a runtime environment 110. As described in detail, below, the runtime environment 110 provides functionality that leverages features of the DBMS 108 along with underlying hardware resources (e.g., processing and memory resources) as described below, to enable operation of the database 106, including loading, accessing, and updating the database 106. For example, the runtime environment 110 captures or utilizes many types of database metadata of the database 106, which, as described herein, may also be updated over time.

An application 112 represents one or more applications that may be configured to access the DBMS 108 and/or the database 106. For example, the application 112 may be used during normal operations of the database 106. For example, the database 106 may be used to track and store transactions executed by the application 112.

In other examples, the application 112 may represent an application used to perform updates to database metadata of the database 106, using the DBMS 108. Specific examples of database metadata, including aspects of the runtime environment 110 (shown in FIG. 1 as various modules or components 138-146), are provided in detail, below.

In example implementations, the archive manager 102 may include a request handler 113 that is configured receive a manual or automated request for database archiving. For example, the request handler 113 may be interoperable with a Graphical User Interface (GUI) provided by a GUI generator 114. Thus, for example, an administrator may be provided with an ability to specify the database 106 or any desired database, for archiving.

For example, a user may specify a particular point in time, which represents an "As Of" time for the archive. In other examples, a user may specify a schedule for the archiving to occur or other policy. For example, an administrator may specify daily, weekly, or monthly archiving of one or more databases represented by the database 106.

The archive manager 102 may include an image generator 115. The image generator 115 may capture a current image of data of the database 106 and store the resulting image within an image copy repository 116 of the archive 104.

The archive manager 102 is also illustrated as including a metadata generator 118. The metadata generator 118 may be configured to determine and capture metadata that includes the runtime environment 110. The metadata generator 118 may be further configured to store the resulting metadata in a metadata library 120 of the archive 104. As referenced above, and described in detail below, the metadata generator 118 may be further configured to generate and populate an archive index 122, which may be used to identify, locate, and retrieve both the image copy and the metadata from the image copy repository 116 and the metadata library 120, respectively, for the relevant archived data of the database 106.

The archive manager 102 also includes a restoration generator 124. As referenced, a user may wish to restore the archived data of the database 106 at the specified timestamp and using the relevant image copy and metadata from the image copy repository 116 and the metadata library 120, respectively. For example, an administrator may use the GUI of the GUI generator 114 to submit a request to the request handler 113 for specified (e.g., timestamped) archived data of the database 106. As also referenced, the archive index 122 may be utilized to identify the desired archived data and associated metadata. The restoration generator 124 may be further configured to re-establish the runtime environment 110 and any other relevant metadata from the metadata library 120, so as to re-allocate and re-deploy the database 106 therewith.

In more detail, the image generator 115 is illustrated as including a timestamp generator 126. The timestamp generator 126 may be configured to generate a timestamp at a desired level of granularity, e.g., in response to an archive request received at the request handler 113 for any data to be archived.

The image generator 115 is also illustrated as including a delta generator 128. The delta generator 128 may be configured to enable capture of the image copy stored in the image copy repository 116 without stopping or disrupting ongoing operations of the database 106.

For example, as referenced above, the application 112 may be configured to access and update the database 106 as part of ongoing operations of the application 112. It is possible for the image generator 115 to capture the image copy for the archive 104 by temporarily stopping the interactions of the application 112 (or any other application) with the database 106. However, doing so may be disruptive to a business or other operator of the application 112 and the database 106.

To avoid such disruptions, the delta generator 128 may access available image copies that may already have been created previously in the context of other operations of the database 106 such as short-term backup or disaster recovery operations. As such image copies may be unlikely to correspond specifically with a timestamp provided by the timestamp generator 126, the delta generator 128 may utilize other source(s) to modify the available image copy to reflect the desired, timestamped image copy.

For example, the delta generator 128 may use existing change accumulation techniques, which may, e.g., create discrete versions of change records and/or log data sets for purposes such as disaster recovery. Additionally, or alternatively, log data may be read directly and applied to the most-recent available image copy. More detailed examples of the delta generator 128 are provided below, e.g., in the context of FIG. 4.

The metadata generator 118 is illustrated as including a metadata selector 130, which may be configured to select the relevant, e.g., the smallest or most efficient, subset of available metadata required to achieve the goals of the metadata generator 118. That is, the DBMS 108 may enable many types of metadata (e.g., configurations, features, etc.) that may be used with databases. Of these, the database 106 may be associated with some subset of metadata. Of this subset of metadata, it may occur that only a further subset of metadata is selected as being necessary and sufficient for re-deployment of an archived version of the database 106.

Therefore, the metadata selector 130 may be configured to analyze the archive request received from the request handler 113, e.g., to determine the types of metadata that should be captured. The metadata selector 130 may be further configured to analyze the database 106, in the context of the runtime environment 110 and the archive request from the request handler 113, to identify all available and potentially required metadata, and thereafter to determine the subset of such metadata to be captured and included in the metadata library with respect to the corresponding image copy of the image copy repository 116. The metadata selector 130 may be further configured to determine where in memory each required type of metadata resides.

Figure 4:
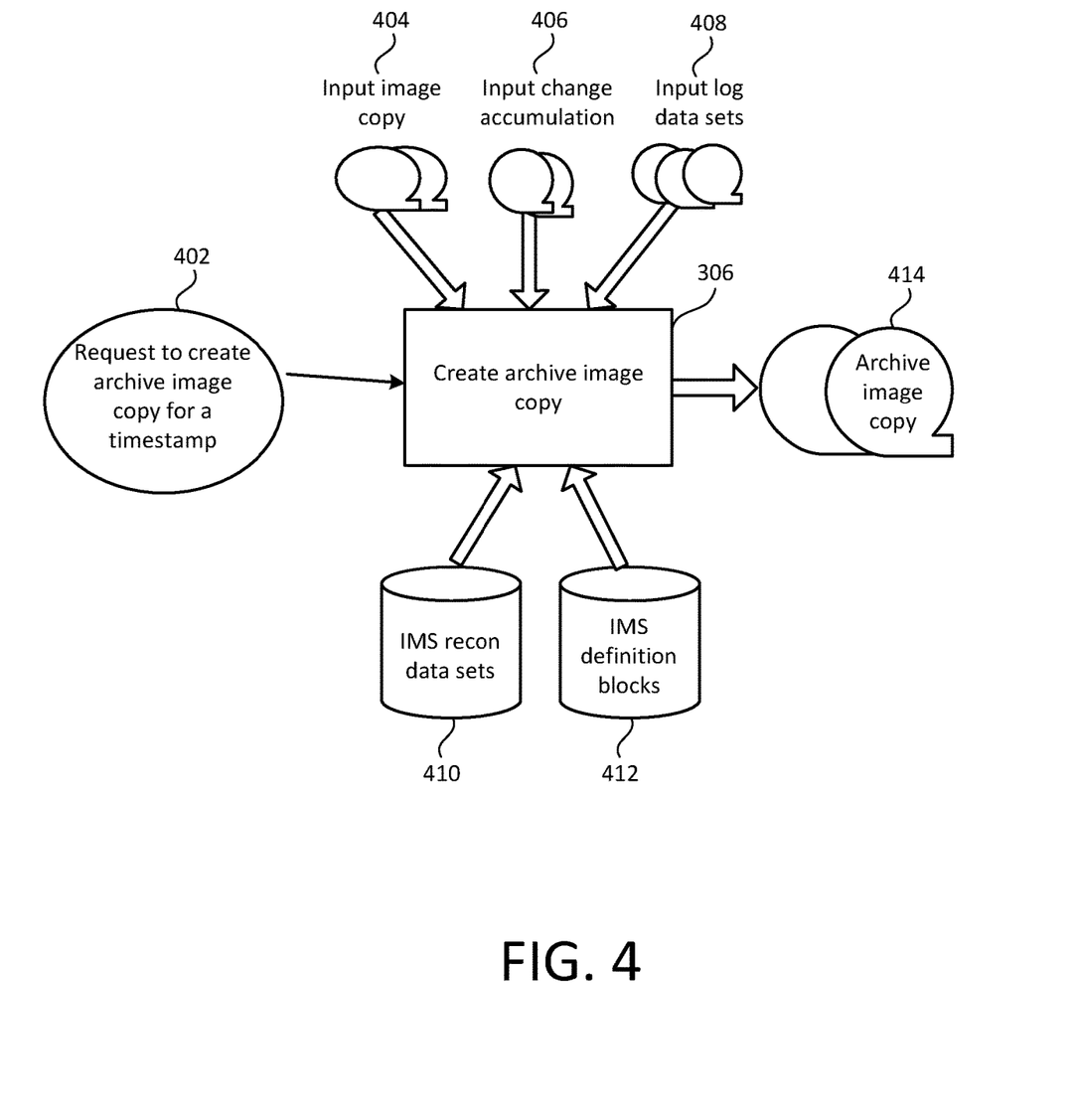
FIG. 4 is a block diagram of an example method for generating archive image copy data in the example of FIG. 3.
Figure 5:
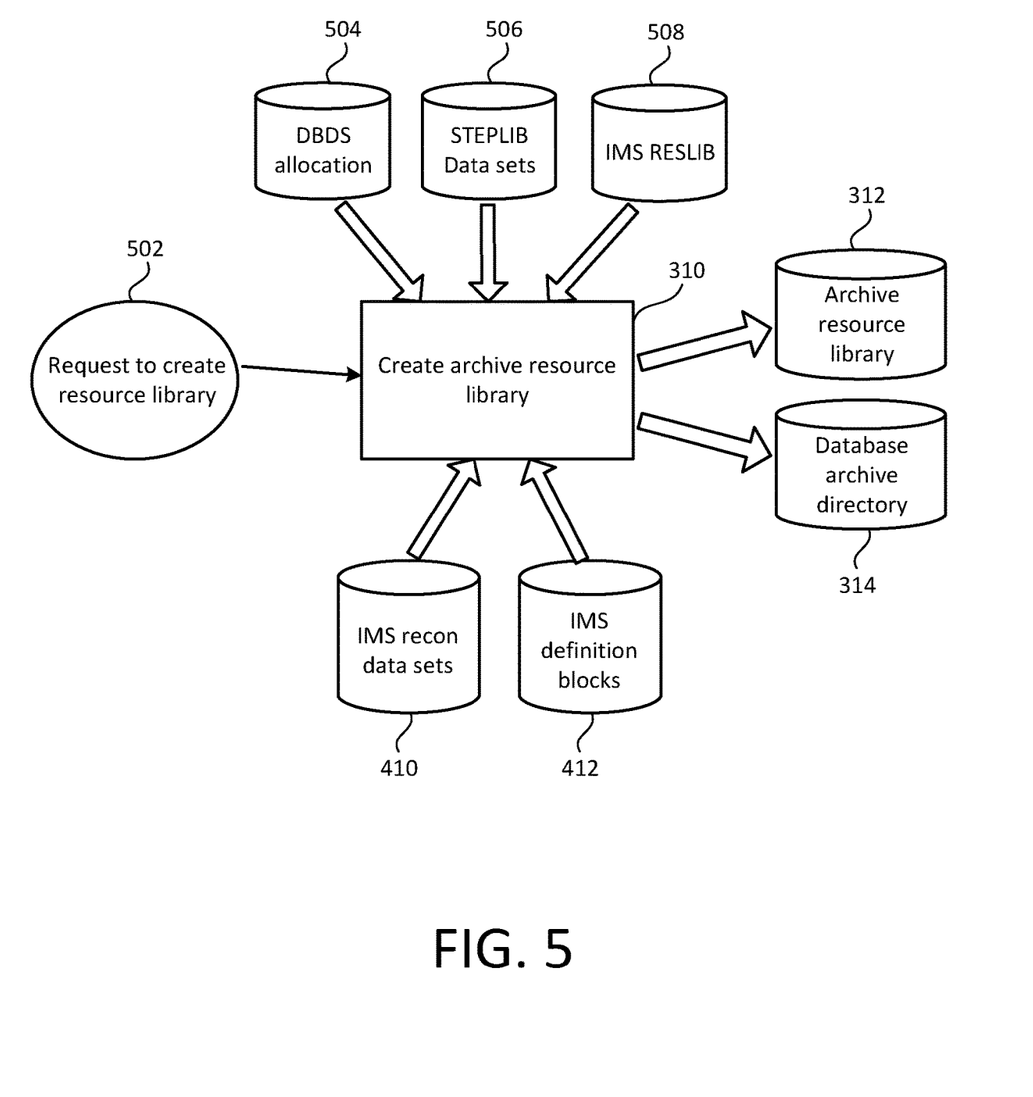
FIG. 5 is a block diagram of an example method for generating an archive resource library in the example of FIG. 3.

In example implementations, the metadata selector 130 may be configured to capture all available database definitions and/or schema for specified databases to be archived, using the IMS definition blocks 412 in FIG. 4 and IMS database definition blocks 610 in FIG. 5. The same information may also be captured for primary indexes, secondary indexes, and any logically related databases associated with the requested databases.

The metadata selector 130 may also collect information related to the requested databases from the IMS recon data sets 410 in FIGS. 4 and 5 (RECON). The metadata selector 130 may be configured to extract any partition selection routine, randomizer routine, compression routine, or other relevant routines from the database definition and IMS RECON information.

Database dataset (DBDS) allocation 504 data may be captured from a set of model allocation statements (as shown in the example of DBDS allocation 504 of FIG. 5, described below). If no DBDS allocation 504 information data is available, DBDS allocation 504 data may be retrieved from another source, e.g., by reading a Multiple Virtual Storage (MVS) operating system catalog entry for the database in question.

The metadata generator 118 is illustrated as including an index generator 132, which may be configured to generate the archive index 122. As referenced above, operations of the image generator 115 and the metadata generator 118 result in populating the image copy repository 116 and the metadata library 120 with pairs of image copies and metadata, where such pairs may number in the thousands, millions, or more, across many different databases and many years of archived data.

In order to identify, locate, and retrieve a specific desired pair of an image copy and associated metadata, the index generator 132 may be configured to generate a corresponding index entry for each pair. For example, such an entry may include a name of the image copy, a timestamp of the image copy, and associated metadata, and a location(s) in memory of the image copy and associated metadata. In additional examples, each entry may include additional information that may be useful in identifying and/or reconstructing the corresponding database, such as a number of partitions in the database when captured, or a reason(s) why the database was archived at the time of the corresponding timestamp. The index generator 132 may be configured to build a cross reference table to save in the archive index 122 to locate and identify desired image copies and/or metadata libraries.

The restoration generator 124 is illustrated as including an archive selector 134, which may be configured to receive a restoration request from the request handler 113 for a specific database that is archived at a specific timestamp to be recovered. For example, the archive selector 134 may be configured to access the archive index 122 to provide, on a GUI of the GUI generator 114, options for identifying and selecting a desired archived database to restore.

For example, the archive selector 134 may provide from the archive index 122 all archives available from a specified date range or having specified data or metadata characteristics. For example, the archive selector 134 may include or use a utility configured to generate all relevant or requested entries of the archive index 122.

Once selected, an environment generator 136 may be configured to retrieve the identified archived database, including, e.g., an identified image copy and corresponding metadata, from memory. For example, the relevant entry of the archive index 122 may specify relevant memory locations.

Then, the environment generator 136 may be configured to generate the runtime environment 110 using the retrieved metadata. For example, the environment generator 136 may generate executable instantiations of various utilities obtained from the metadata library 120 and needed for deploying, accessing, and otherwise utilizing the database 106.

As referenced above, FIG. 1 illustrates a number of specific examples 138, 140, 142, 144, and 146 of metadata in the context of the runtime environment 110 of the database 106. Some of the examples 138, 140, 142, 144, and 146 may be generic to many types of databases and associated database management systems, while others may be more specific to the example context of FIGS. 3 through 6, in which example metadata for IMS systems and DL/I are provided. It will be appreciated that all such examples are non-limiting and merely for the sake of illustration and that many types of metadata may be used in specific implementations of the system of FIG. 1.

In the example of FIG. 1, the runtime environment 110 includes database definitions 138. As referenced, database definitions include mappings of names, structures, relationships, and sizes of one or more database fields or groups of fields.

A randomizer 140 may be used in a hierarchical database such as the IMS system database. Such a hierarchical database may identify and update a specific record using the hierarchical structure, such as by identifying a child record based on a parent record and root record. Therefore, it is possible to retrieve desired records by, e.g., identifying and following a root node to the desired record(s). For large hierarchies, however, it may be more efficient to be able to identify an individual record, or segment of records, more directly. For example, the randomizer 140 may represent a utility or other program configured to use a key of a specific record to determine where the record resides in storage.

Then randomizer 140 may be implemented as an example of an exit program. For example, an exit program may be implemented in conjunction with an exit point of an operating system or DBMS 108, which may be designated and configured by a provider of the operating system or DBMS 108, and which provides users with an ability to design and implement specific operations associated with the exit point. For example, for the randomizer 140, an exit point may be designated by the provider of the DBMS 108 in conjunction with portions of the DBMS 108 associated with record retrieval. In this way, different users may configure record access in different, desired manners.

Thus, the randomizer 140 provides an illustrative example of metadata that is useful to be selected by the metadata selector 130 and captured by the metadata generator 118 for inclusion in the metadata library 120. For example, without the randomizer 140, it may be difficult or impossible to access data of an archived image copy of the database 106 when restored by the restoration generator 124.

Similarly, a dynamic database allocation routine 142 refers to a program and associated techniques for allocating data to memory locations during runtime as opposed to, e.g., statically pre-allocating data. For example, a user may provide a control statement that designates rules for such dynamic allocation, and a control block may be constructed from such the control statement so that the control statement may be dynamically executed during runtime.

Recovery control data 144 may refer to a relevant portion of a large repository of the DBMS 108 (e.g., of IMS system databases) that stores database definitions for databases of the DBMS 108 (e.g., IMS recon data sets 410 in FIGS. 4 and 5). Thus, such a repository serves as an example source of database definitions that may be relevant to the runtime environment 110. In the context of FIG. 1, the recovery control data 144 may be captured in the metadata library 120 during archive generation and may later be used during restoration to populate the same dataset with the definitions that existed at the time of the archive generation.

Finally in the runtime environment 110, a partition selection routine 146 refers to a program that may be configured to select the partition where a database record will reside in database 106. As referenced above, a partition refers to a subdivision or subset of the database 106 that may be treated individually in some respects, while still being part of the database 106. For example, a high availability database (HALDB) may consist of many partitions.

For example, the database 106 may be allocated to have three partitions, but may later be updated to have six partitions. Partition allocation, and selection, may be performed according to designated rules, which again may be changed as part of an update process. By capturing the partition selection routine 146 using the metadata library 120 at a time of archive generation of a specific timestamped archive, the archive manager 102 enables later use of the same partition selection routine 146 by the restoration generator 124 to restore the specific timestamped archive.

In FIG. 1, the archive manager 102 is illustrated as being implemented using at least one computing device 150, including at least one processor 152, and a non-transitory computer-readable storage medium 154. That is, the non-transitory computer-readable storage medium 154 may store instructions that, when executed by the at least one processor 152, cause the at least one computing device 150 to provide the functionalities of the archive manager 102 and related functionalities. The non-transitory computer-readable storage medium 154 may represent one or more memories, which may be used to store any and all of the archive 104 and portions thereof.

More specifically, the one or more memories represented by the non-transitory computer-readable storage medium 154 may include a primary memory or memories used to implement the DBMS 108, e.g., during operations of the database 106. One or more secondary memories may be used to store the archive 104, such as a direct-access storage device (DASD) or tape backup.

In example implementations, the at least one computing device 150 may include one or more mainframe computers or one or more servers, while the application 112 and the DBMS 108 represent programs that may have be executed using the at least one computing device 150, and/or that have access to the at least one computing device 150, while executing on local devices.

Figure 2:
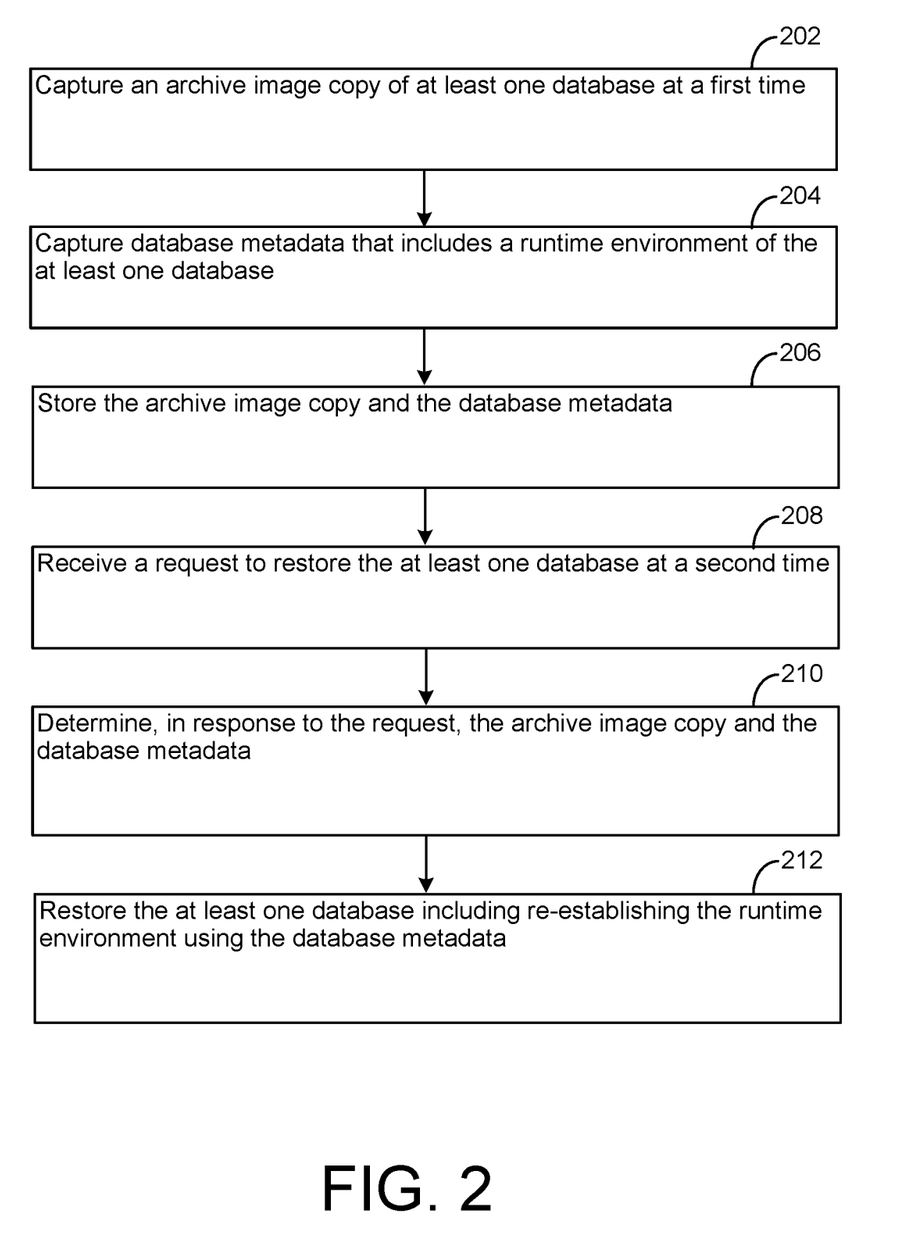
FIG. 2 is a flowchart illustrating example operations of the system of FIG. 1.

FIG. 2 is a flowchart illustrating example operations of the system of FIG. 1. In the example of FIG. 2, operations 202-212 are illustrated as separate, sequential operations. In various implementations, the operations 202-212 may include sub-operations, may be performed in a different order, may include alternative or additional operations, or may omit one or more operations. Further, in all such implementations, included operations may be performed in an iterative, looped, nested, or branched fashion.

In the example of FIG. 2, an archive image copy of at least one database may be captured at a first time (202). For example, the image generator 115 may capture an image copy of the database 106 at the first time for storage within the image copy repository 116.

Database metadata that includes a runtime environment of the at least one database may be captured (204). For example, the metadata generator 118 may capture metadata that includes the runtime environment 110 of the database 106 at the first time for storage within the metadata library 120. In other example, the metadata may be captured at a different time than the first time, e.g., either before or after the first time, as long as the metadata captured corresponds to (enables the use and access of) the image copy as captured at the first time.

Thus, both the archive image copy and the database metadata may be stored (206). Although the image copy repository 116 is illustrated separately from the metadata library 120 in FIG. 1, it will be appreciated that pairs of individual image copies and corresponding metadata may be stored together in some implementations or may be stored separately while being identifiable as being related, e.g., using the archive index 122.

A request to restore the at least one database at a second time may be received (208). For example, the restoration generator 124 of FIG. 1 may receive a restoration request from the request handler 113 at a second time that may be, e.g., years after the initial capture and storage of the image copy and associated metadata.

In response to the request, the archive image copy and the database metadata may be determined (210). For example, the archive selector 134 of the restoration generator 124 may use the archive index 122 to identify the requested archive data to be restored.

Then, the at least one database may be restored, including re-establishing the runtime environment using the database metadata (212). For example, the environment generator 136 of the restoration generator 124 may recreate specific elements or modules of the runtime environment 110, including, e.g., one or more of the components 138 140, 142, 144, or 146 of the runtime environment 110.

For ease of illustration and explanation, as referenced above, many of the examples of FIGS. 3 through 6 below are in the context of IMS databases and DB/I. For example, FIG. 3 illustrates receipt 302 of a request to create database archive for a timestamp.

In response, a create a database archive 304 proceeds with a create archive image copy 306, stored in database archive image copy data 308. As described with respect to FIGS. 1 and 2, the create a database archive 304 proceeds with a create archive resource library 310 of both a database archive resource library 312 (representing an example of the metadata library 120 of FIG. 1) and of a database archive directory 314 (representing an example of the archive index 122 of FIG. 1).

Figure 3:
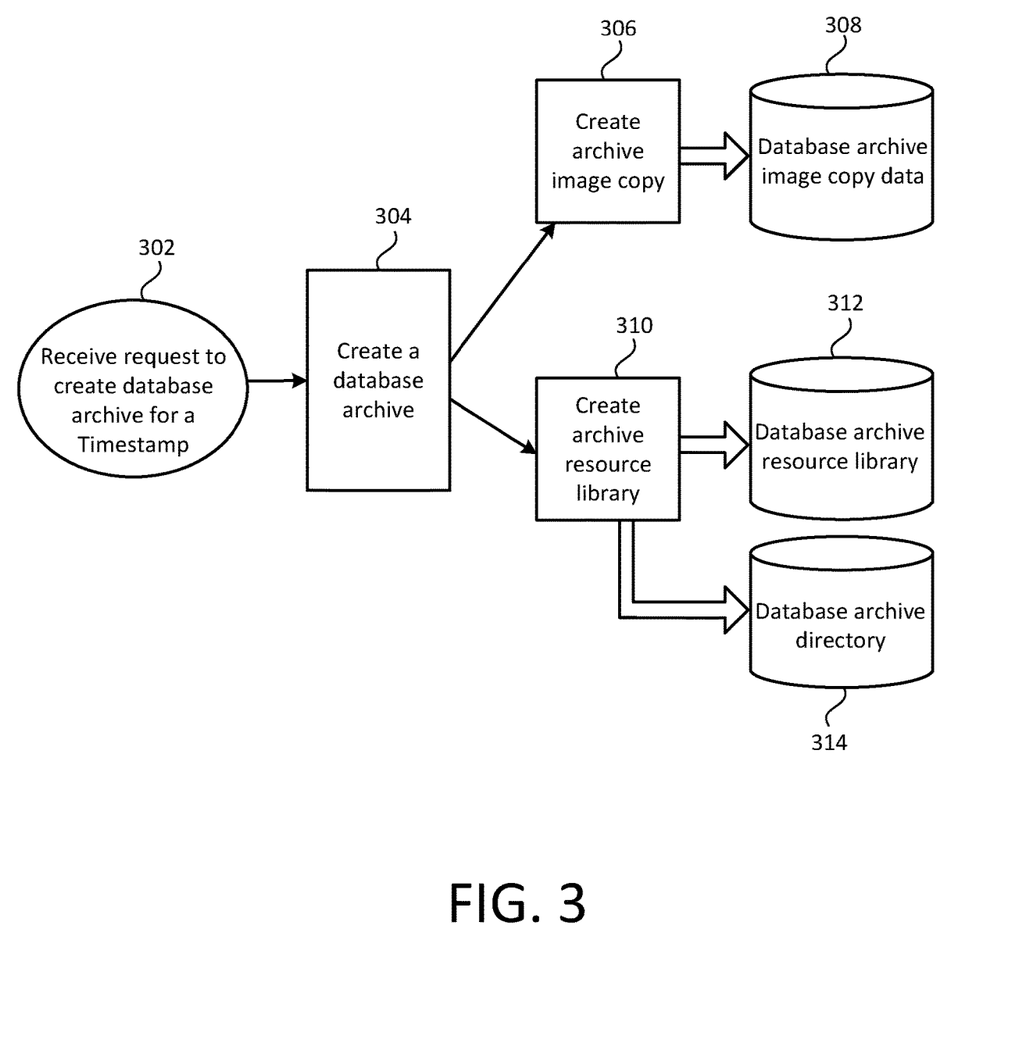
FIG. 3 is a block diagram of a more specific implementation of the system of FIG. 1.

FIG. 4 illustrates a more detailed example of the create archive image copy 306 for a timestamp of FIG. 3. FIG. 4 illustrates a receipt of a request to create archive image copy for a timestamp 402, as part of the create a database archive 304 as shown in FIG. 3.

In FIG. 4, the create archive image copy 306 is illustrated as being implemented using a version of the delta generator 128 of the image generator 115 of FIG. 1. For example, FIG. 4 illustrates an input image copy 404, an input change accumulation 406, and an input log data sets 408.

As described with respect to the delta generator 128 of FIG. 1, use of the input image copy 404 with the input change accumulation 406 and the input log data sets 408 enables avoidance of accessing the database 106 itself while the database 106 is being accessed during normal operations. As a result, no database downtime is required, and no database authorization is needed.

Instead, the input image copy 404 may represent a batch or concurrent image copy that may already be captured as part of, e.g., normal backup operations. Such captures may occur at regularly scheduled intervals or times, such as end of day or end of week.

The input change accumulation 406 and/or the input log data sets 408 may then be used to account for any updates or other changes to the database 106 that may have occurred between the scheduled capture and the time of the timestamp associated with the request to create archive image copy for a timestamp 402. In other words, the input change accumulation 406 and the input log data sets 408 may be used to bring the input image copy 404 current with respect to the timestamp and thereby provide a logically consistent backup that includes all committed updates up to the specified timestamp. In FIG. 4, IMS recon data sets 410 and IMS definition blocks 412 may be used to identify all available databases for which an archive image copy 414 will be created in response to an archive request, using the existing input image copy 404, the input change accumulation 406, and the input log data sets 408.

In FIG. 5, the create archive image copy of FIGS. 3 and 4 is illustrated as a request to create resource library 502 to a create archive resource library 310, resulting in the archive resource library 312 as well as the database archive directory 314. In FIG. 5, the IMS recon data sets 410 (including database recovery control (DBRC) data) and the IMS definition blocks 412 provide potential sources of metadata, including metadata related to runtime or execution of the database 106 being archived, at the timestamp of the archiving.

DBDS allocation 504 relates to the types of data allocation referenced above with respect to FIG. 1 (e.g., dynamic database allocation routine 142). The database dataset allocation data may be recorded by the metadata generator 118 in the directory 314. The Dynamic allocation routine uses these model definitions to apply a supplied dataset naming mask and other overriding parameters to generate a new set of dynamic allocation definitions at the time of database restoration. Any type of user exit programs, including the randomizer 140 and the partition selection routine 146 of FIG. 1, may be accessed and included as needed in the archive resource library 312. In the IMS system database, the exit programs may reside in the Archive generator JCL STEPLIB concatenation or in the IMS RESLIB and may be copied to the archive resource library by the metadata generator 118. Additionally or alternatively, any other load modules may be selected and stored in the archive resource library 312 if needed to re-establish a runtime environment of the database being archived.

The database archive image copy data set (and/or relevant attributes thereof) of FIGS. 3 and 4, as well as the archive resource library 312 (and/or relevant attributes thereof) of FIGS. 3 and 5, may be captured in the database archive directory 314. As described and referenced herein, the database archive directory 314 contains information about the database archives created, as well as other information for each archive. The database archive directory data set provides a comprehensive index to all the database archives and provides ready access to the data. The directory data set may be stored as a virtual sequential access method (VSAM), key sequential data set (KSDS) file. The data records may be arranged according to the timestamp of their creation, which may also be used for purposes of database restoration, as described herein.

Figure 6:
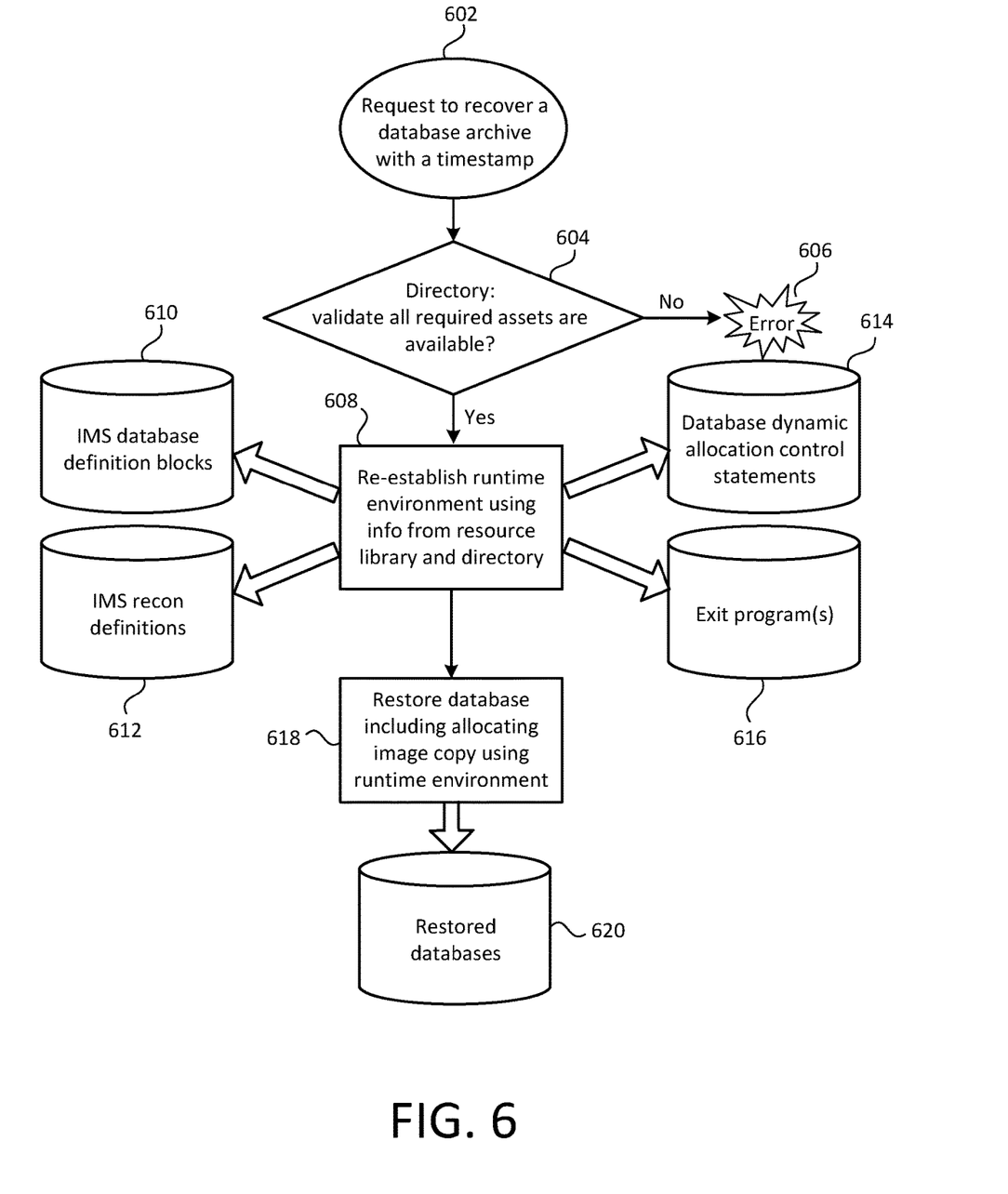
FIG. 6 is a flowchart illustrating an example recovery method that may be used in the example systems of FIGS. 1 and 3.

FIG. 6 is a flowchart illustrating an example recovery method that may be used in the example systems of FIGS. 1 and 3. In the example of FIG. 6, a request is received (602) to restore one or more database archive(s), specified by specific timestamp.

The database archive directory 314 may be accessed and read to validate whether all required metadata assets are available for use in re-establishing a runtime environment of the archived database being restored (604). If not, an error may be generated (606).

If so, then the relevant runtime environment may be re-established (608) using information from the relevant metadata resource library 312, as well as from the archive directory 314 itself. For example, an index of the directory 314 may be accessed using the timestamp and other available identifying information.

For example, any assets required to establish the same runtime environment that existed when the database archive was created may be rebuilt. Examples of such rebuilt assets may include IMS database definition blocks 610.

Further, resources for IMS recon definitions 612 may be generated. For example, control statements may be generated to register databases in the IMS recon definitions 612, including, e.g., key range definitions that were in effect when the archived data was captured.

Database dynamic allocation control statements 614 may be generated for database data sets. As described, such control statements may then be used to perform the same types of dynamic data allocation configured to occur in the original runtime environment.

Any user exit programs 616 may be populated. For example, the randomizer routine similar to the randomizer 140 of FIG. 1 may be populated. Similarly, a partition selection exit program or compression exit program may be populated to an executable library.

Then, the archived database may be restored (618), including allocating the stored image copy data sets using the rebuilt runtime environment, and dynamically allocating all data sets of the archived database, to obtain restored database(s) 620. As may be appreciated from the above description, the restored database(s) 620 are thus fully available for use, in the same manner(s) as when the database was archived. For example, the application 112 may be executed against the restored database 620, as the relevant exist programs, recon definitions, and other metadata and aspects of the rebuilt runtime environment are available for use.

Figure 7:
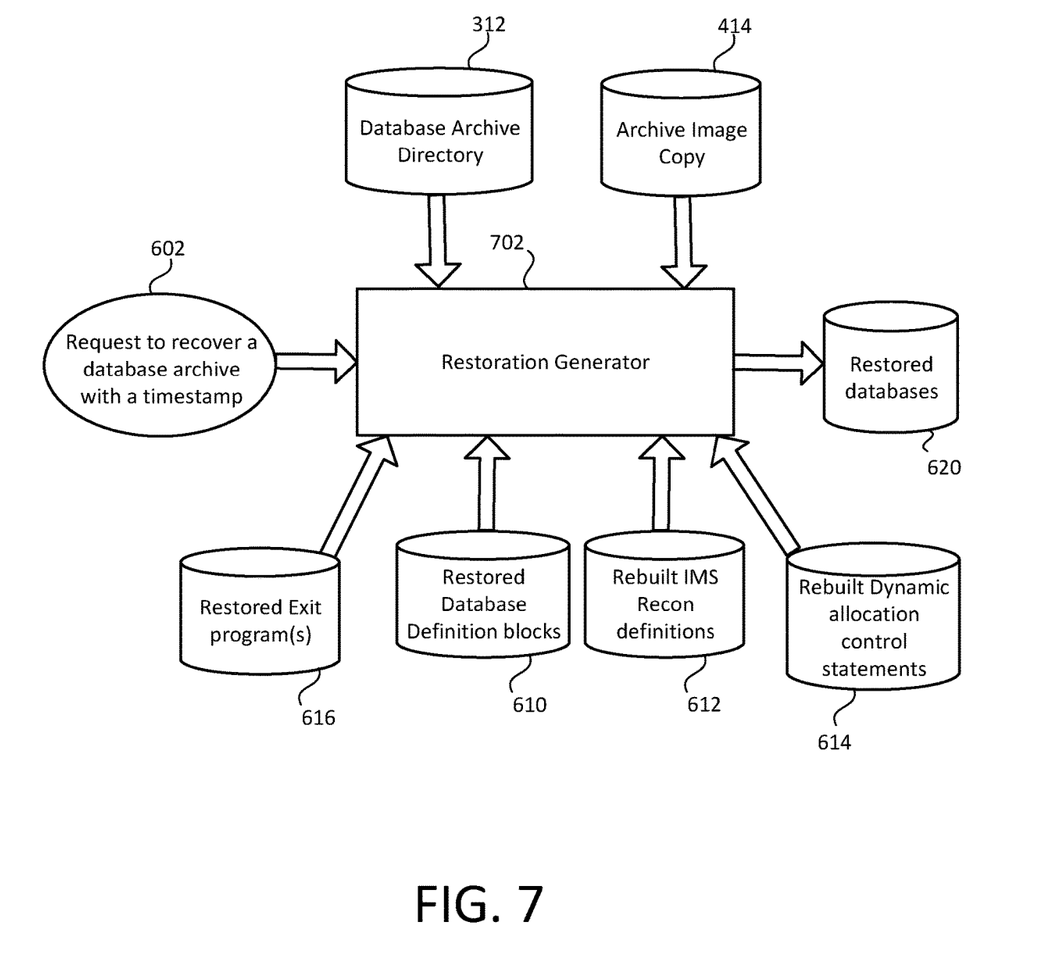
FIG. 7 is a block diagram of an example implementation of a restoration generator of FIG. 1, used in the example of FIG. 6.

FIG. 7 is a block diagram of an example implementation of the restoration generator 124 of FIG. 1, used in the example of FIG. 6. In the example of FIG. 7, a restoration generator 702 receives the request 602 of FIG. 6 and utilizes the outputs of the re-established runtime environment to generate the restored databases 620. For example, as shown, the restoration generator 702 may access the database archive directory 312 and the archive image copy 414. The restoration generator 702 may further access the restored database definition blocks 610, the rebuilt IMS recon definitions 612, the rebuilt dynamic allocation control statements 614, and the restored exit programs 616.

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
    capture an archive image copy of at least one database at a first time;
    capture database metadata that includes a runtime environment of the at least one database, the runtime environment including at least one executable routine for accessing the at least one database;
    store the archive image copy and the database metadata;
    update an archive index with at least one memory location of the archive image copy and the database metadata;
    receive a request to restore the at least one database at a second time;
    retrieve, in response to the request and using the archive index, the archive image copy and the database metadata from the at least one memory location; and
    restore the at least one database by re-establishing the runtime environment using the database metadata, including instantiating the at least one executable routine.

2. The computer program product of claim 1, wherein the instructions are further configured to cause the at least one computing device to:
    capture the archive image copy including selecting an existing image copy from a prior time that occurred before the first time, and updating the existing image copy using changes to the at least one database that occurred between the prior time and the first time.

3. The computer program product of claim 1, wherein at least one database includes an information management systems (IMS) database.

4. The computer program product of claim 1, wherein the at least one executable routine includes a partition selection routine.

5. The computer program product of claim 1, wherein the instructions are further configured to cause the at least one computing device to:
    capture the runtime environment including recovery control data of the at least one database.

6. The computer program product of claim 1, wherein the at least one executable routine includes a dynamic database allocation routine of the at least one database.

7. The computer program product of claim 1, wherein the instructions are further configured to cause the at least one computing device to:
    generate the archive index including at least one entry for the at least one database, the at least one entry specifying a timestamp of the first time and a name of the archive image copy.

8. The computer program product of claim 1, wherein the instructions are further configured to cause the at least one computing device to:
    generate the archive index including at least one entry for the at least one database, the at least one entry specifying a timestamp of the first time and a name of the archive image copy.

9. A computer-implemented method, the method comprising:
    capturing an archive image copy of at least one database at a first time;
    capturing database metadata that includes a runtime environment of the at least one database, the runtime environment including at least one executable routine for accessing the at least one database;
    storing the archive image copy and the database metadata;
    updating an archive index with at least one memory location of the archive image copy and the database metadata;
    receiving a request to restore the at least one database at a second time;
    retrieving, in response to the request and using the archive index, the archive image copy and the database metadata from the at least one memory location; and
    restoring the at least one database including re-establishing the runtime environment using the database metadata, including instantiating the at least one executable routine.

10. The method of claim 9, wherein the capturing the archive image copy includes:
    selecting an existing image copy from a prior time that occurred before the first time, and updating the existing image copy using changes to the at least one database that occurred between the prior time and the first time.

11. The method of claim 9, wherein the at least one database includes an information management systems (IMS) database.

12. The method of claim 9, wherein the at least one executable routine includes a partition selection routine of the runtime environment.

13. The method of claim 9, wherein capturing the database metadata includes:
    capturing runtime control data of the runtime environment.

14. The method of claim 9, wherein the at least one executable routine includes a dynamic database allocation routine.

15. The method of claim 9, further comprising:
    generating the archive index including at least one entry for the at least one database, the at least one entry specifying a timestamp of the first time and a name of the archive image copy.

16. A system comprising:
    at least one memory including instructions; and
    at least one processor that is operably coupled to the at least one memory and that is arranged and configured to execute instructions that, when executed, cause the at least one processor to:

capture an archive image copy of at least one database at a first time;

capture database metadata that includes a runtime environment of the at least one database, the runtime environment including at least one executable routine for accessing the at least one database;

store the archive image copy and the database metadata;

update an archive index with at least one memory location of the archive image copy and the database metadata;

receive a request to restore the at least one database at a second time;

retrieve, in response to the request and using the archive index, the archive image copy and the database metadata from the at least one memory location; and restore the at least one database including re-establishing the runtime environment using the database metadata, including instantiating the at least one executable routine.

17. The system of claim 16, wherein the instructions, when executed, are further configured to cause the at least one processor to:

capture the archive image copy including selecting an existing image copy from a prior time that occurred before the first time, and updating the existing image copy using changes to the at least one database that occurred between the prior time and the first time.

18. The system of claim 16, wherein at least one database includes an information management systems (IMS) database.

19. The system of claim 16, wherein the at least one executable routine includes a partition selection routine.

20. The system of claim 16, wherein the instructions, when executed, are further configured to cause the at least one processor to:

capture the runtime environment including recovery control data of the at least one database.

* * * * *